United States Patent
Tee et al.

(10) Patent No.: US 7,620,018 B2
(45) Date of Patent: Nov. 17, 2009

(54) APPARATUS AND METHOD FOR A MULTI-CHANNEL ORTHOGONAL FREQUENCY DIVISION MULTIPLEXING WIRELESS NETWORK

(75) Inventors: Lai King Tee, Dallas, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 11/294,190

(22) Filed: Dec. 5, 2005

(65) Prior Publication Data

US 2006/0171354 A1 Aug. 3, 2006

Related U.S. Application Data

(60) Provisional application No. 60/649,295, filed on Feb. 2, 2005, provisional application No. 60/694,195, filed on Jun. 27, 2005.

(51) Int. Cl.
*H04W 4/00* (2009.01)
(52) U.S. Cl. .............. 370/332; 370/329; 370/330; 370/341
(58) Field of Classification Search .......... 370/332, 370/203
See application file for complete search history.

(56) References Cited

U.S. PATENT DOCUMENTS

2002/0122465 A1 * 9/2002 Agee et al. ............... 375/141
2005/0207385 A1   9/2005 Gorokhov et al.
2006/0250935 A1 * 11/2006 Hamamoto et al. ......... 370/203

* cited by examiner

*Primary Examiner*—Patrick N. Edouard
*Assistant Examiner*—Wayne Cai (57) ABSTRACT

A flexible and scalable deployment of orthogonal frequency division multiplexing (OFDM) technology in a mobile cellular system, including a system that deploys multiple channels within a common base station, in which overlapping subcarriers are accepted and a significant amount of resulting interference is corrected.

20 Claims, 5 Drawing Sheets

APPARATUS AND METHOD FOR A MULTI-CHANNEL ORTHOGONAL FREQUENCY DIVISION MULTIPLEXING WIRELESS NETWORK

CROSS-REFERENCE TO RELATED APPLICATION AND CLAIM OF PRIORITY

The present application is related to that disclosed in U.S. Provisional Patent No. 60/649,295, filed Feb. 2, 2005, entitled "Apparatus and Method for a Multi-Channel Orthogonal Frequency Division Multiplexing Wireless Network", and to that disclosed in U.S. Provisional Patent No. 60/694,195, filed Jun. 27, 2005, entitled "A Multi-Channel OFDM Systems with Adaptive Guard Bands." U.S. Provisional Patent Nos. 60/649,295 and 60/694,195 are assigned to the assignee of the present application. The subject matter disclosed in U.S. Provisional Patent Nos. 60/649,295 and 60/694,195 is hereby incorporated by reference into the present disclosure as if fully set forth herein. The present application hereby claims priority under 35 U.S.C. §119(e) to U.S. Provisional Patent Nos. 60/649,295 and 60/694,195.

TECHNICAL FIELD OF THE INVENTION

The present application relates generally to wireless networks and, more specifically, to an orthogonal frequency division multiplexing (OFDM) wireless network.

BACKGROUND OF THE INVENTION

Orthogonal frequency division multiplexing (OFDM) is a multi-carrier transmission technique in which a user transmits on many orthogonal frequencies (or carriers). The orthogonal carriers are individually modulated and closely spaced, but do not interfere with one another. This provides high spectral efficiency and resistance to multipath effects. An orthogonal frequency division multiple access (OFDMA) system allows some carriers (or sub-carriers) to be assigned to different users, rather than to a single user. Today, OFDM transmission techniques are used in both wireline transmission systems and wireless transmission systems. OFDM and OFDMA techniques are also used for wireless digital audio and video broadcasting.

However, conventional OFDM/OFDMA networks do not fully and efficiently utilize the full bandwidth allocated or available to a base station in a wireless network. In particular, OFDM/OFDMA networks do not efficiently utilize the spacing between frequency channels in the available bandwidth of a given channel block.

Therefore, there is a need in the art for improved orthogonal frequency division multiplexing (OFDM) transmission systems and improved orthogonal frequency division multiple access (OFDM) transmission systems that allows efficient deployment of the system in spectrum blocks with various bandwidth.

SUMMARY OF THE INVENTION

In one embodiment, a wireless network base station is provided comprising a channel controller for configuring the wireless network base station to communicate on at least a first channel having a plurality of subcarriers across a first bandwidth allocation and a second channel having a plurality of subcarriers across a second bandwidth allocation. The subcarriers of the first channel overlap with subcarriers of the second channel. The wireless network base station performs an error correction coding, bit-interleaving and/or symbol interleaving across the subcarriers, according to the number of subcarriers of the first channel that overlap with subcarriers of the second channel to enable a subscriber station to correct adjacent-channel interference from one or more overlapping subcarriers.

In another embodiment, a wireless network base station is provided comprising a channel controller for configuring the wireless network base station to communicate on at least a first channel having a plurality of subcarriers across a first bandwidth allocation corresponding to a first FFT size. The subcarriers of the first channel are divided into a plurality of sets of subcarriers. Different ones of the plurality of sets of subcarriers are assigned to separate subscriber stations. A guard subcarrier is created between two of the plurality of sets of subcarriers by loading a modulation symbol with zero magnitude to at least one subcarrier between the two of the plurality of sets of subcarriers. Note that alternative terms for guard subcarriers include null subcarriers, virtual subcarriers, and unused subcarriers, among others known to those of skill in the art.

In still another embodiment, a wireless network base station is provided comprising a channel controller for configuring the wireless network base station to communicate on at least a first channel having a plurality of subcarriers across a first bandwidth allocation corresponding to a first FFT size. The subcarriers of the first channel are divided into a plurality of sets of subcarriers. Different ones of the plurality of sets of subcarriers are assigned to separate subscriber stations. The wireless network base station performs error correction coding to enable the subscriber stations to correct adjacent-channel interference between different ones of the plurality of sets of subcarriers.

Another embodiment provides a method of operating a wireless network base station comprising the steps of communicating with subscriber stations on at least a first channel having a plurality of subcarriers across a first bandwidth allocation and a second channel having a plurality of subcarriers across a second bandwidth allocation, wherein the subcarriers of the first channel overlap with subcarriers of the second channel, and performing an error correction coding to enable a subscriber station to correct adjacent-channel interference from overlapping subcarriers.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

In some implementations of OFDM-based technology, such as IEEE-802.16x, multiple Fast Fourier Transform (FFT) sizes are supported, corresponding to different channel bandwidths supported by the standard. OFDM standards, however, do not specify the deployment scenario of placing multiple adjacent carriers with smaller FFT size in a wider bandwidth. Thus, the default configuration for multiple adjacent OFDM channels leads to the relatively lower spectral usage efficiency.

The present disclosure provides a flexible and scalable deployment of orthogonal frequency division multiplexing (OFDM) technology in a wireless network system, thereby enabling higher spectral efficiency. The embodiments discussed herein are implemented in a system that employs multiple channels, preferably within a common base station, each of which uses OFDM/OFDMA techniques. Each channel may be used as a transmission link to a subscriber station. Multiple channels may be used for groups of different users. Alternatively, multiple channels may be used to provide a high bandwidth transmission link to a group of users, if necessary. Therefore, a wireless network according to the principles of the present disclosure enables scalability and flexibility in meeting the different demands in channel bandwidth by various users.

As used herein, "channel" refers to a portion of the frequency spectrum block, which is subdivided into multiple "subcarriers". The number of subcarriers in a channel can be referred to as the "Fast Fourier Transform size" or "FFT size". Those of skill in the art recognize that alternate terms are sometimes used for these concepts, including in particular the use of the term "carrier" in place of "channel" to refer to a contiguous set of frequencies, which is subdivided into multiple "subcarriers", and the use of the term "tones" to refer to the subcarriers. The principles described herein will be understood by those of skill in the art to apply regardless of the particular terminology used.

Figure 1:
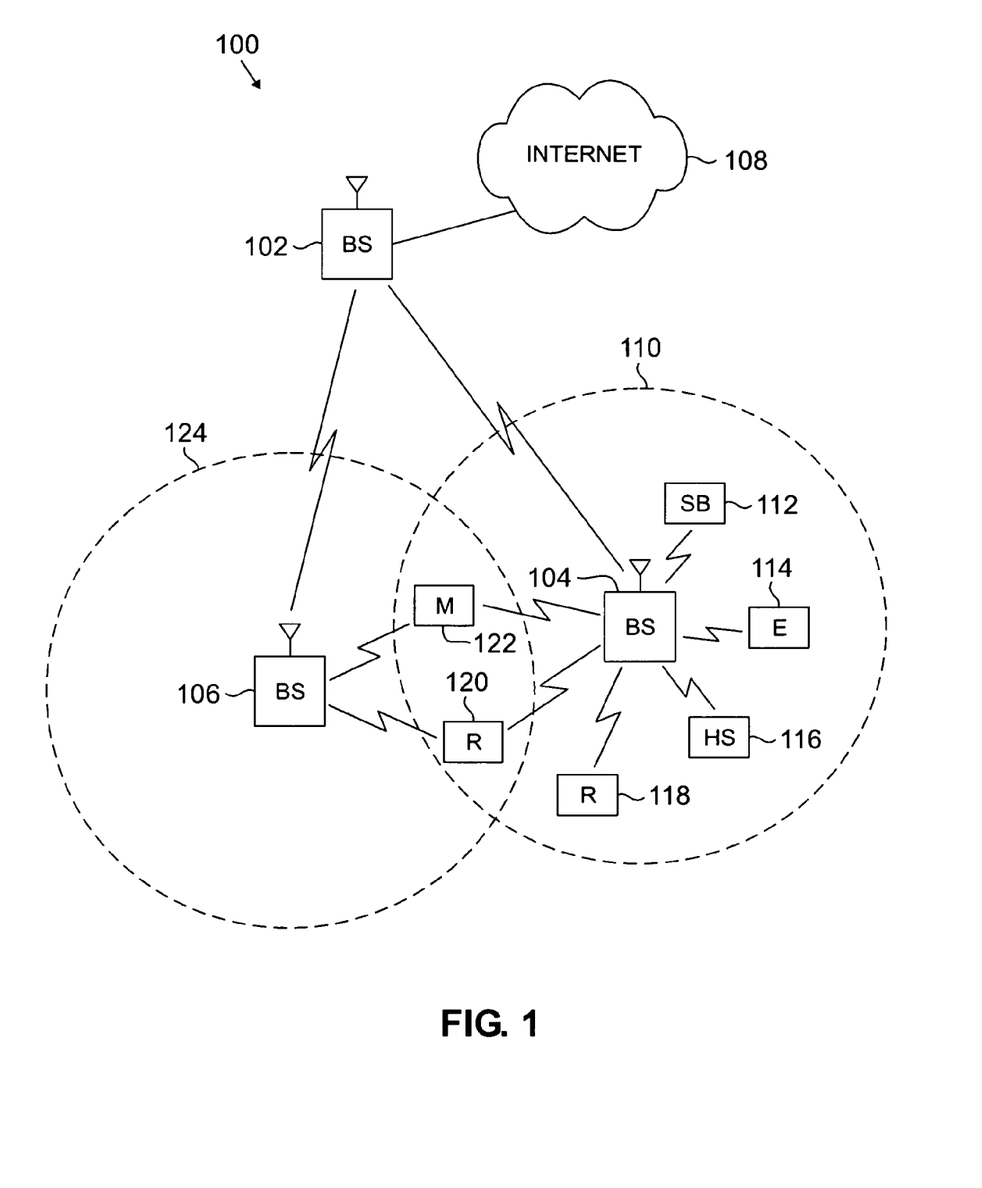
FIG. 1 illustrates an exemplary wireless network, in which orthogonal frequency division multiplexing (OFDM) is deployed in multiple channels according to the principles of the present disclosure.

FIG. 1 illustrates an exemplary wireless network 100, in which orthogonal frequency division multiplexing (OFDM) is deployed in multiple channels according to the principles of the present disclosure. In an embodiment, the wireless network 100 includes a first base station 102 that is in communication with a second base station 104 and a third base station 106. Base station 102 is in communication with Internet 108 or another data network (not shown). Base station 104 provides wireless broadband access to Internet 108, via base station 102, to a plurality of subscriber stations (SSs) within a coverage area 110 of base station 104 including a first subscriber station 112 in a small business, a second subscriber station 114 in an enterprise, a third subscriber station 116 in a WiFi hotspot, a fourth subscriber station 118 in a first residence, a fifth subscriber station 120 in a second residence, and a sixth subscriber station 122 in a mobile device.

Base station 106 provides wireless broadband access to Internet 108, via base station 102, to a plurality of subscriber stations within a coverage area 124 of base station 106 including subscriber station 120 and subscriber station 122. Alternatively, base station 103 may be connected directly to the Internet through a wired broadband connection, such as an optical fiber, DSL, cable or T1/E1 line. In other embodiments, base station 102 may be in communication with either a greater number or a lesser number of base stations. Additionally, while only six subscriber stations have been depicted in FIG. 1, it is understood that in one embodiment, wireless network 100 may be expected to provide wireless broadband access to additional subscriber stations.

Note that subscriber station (SS) 120 and subscriber station (SS) 122, associated with the second residence and the mobile device respectively, are on the edge of the two coverage areas 110 and 124. Subscriber station 120 and subscriber station 122 each communicate with both base station 104 and base station 106 and may be said to be operating in handoff mode, as known to those of skill in the art.

In an embodiment, base stations 102, 104, and 106 may communicate with each other and with subscriber stations 112, 114, 116, 118, 120, 122 using an IEEE-802.16 wireless metropolitan area network standard, for example, an IEEE-802.16e standard. In another embodiment, however, a different wireless protocol may be employed, for example, a HIPERMAN wireless metropolitan area network standard. Base station 102 may communicate through direct line-of-sight or non-line-of-sight with base station 104 and base station 106, depending on the technology used for the wireless backhaul. Base station 104 and base station 106 may each communicate through non-line-of-sight with subscriber stations 112, 114, 116, 118, 120, and 122 using orthogonal frequency division multiplex techniques.

Base station 104 may provide T1-level service to subscriber station 114 associated with the enterprise and fractional T1-level service to subscriber station 112 associated with the small business. Base station 104 may provide wireless backhaul for subscriber station 116 associated with the WiFi hotspot, which may be located in an airport, café, hotel, or college campus. Base station 104 may provide digital subscriber line (DSL) level service to subscriber stations 118, 120 and 122. Subscriber stations 112, 114, 116, 118, 120 and 122 may use the broadband access to the Internet 108 to access voice, data, video, video teleconferencing, and/or other broadband services. In an embodiment, one or more of subscriber stations 112, 114, 116, 118, 120 and 122 may be associated with an access point (AP) of a WiFi WLAN. The sixth subscriber station 122 may include any of a number of mobile devices including a wireless-enabled laptop computer, personal data assistant, notebook, handheld device, or other wireless-enabled device. Subscriber stations 118 and 120 may include a wireless-enabled personal computer, laptop computer, gateway, or other device.

Dotted lines show the approximate extents of the coverage areas 110 and 124, which are shown as approximately circular for the purposes of illustration and explanation only. It should be understood that the coverage areas associated with base stations, for example, coverage areas 110 and 124 associated with base station 104 and base station 106, may have other shapes, including an irregular shape, depending upon the configuration of the base stations and the radio environment that may depend upon natural and man-made obstructions. The coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 110 and 124 of base stations 104 and 106 may extend in the range from less than 2 kilometers to about fifty kilometers from the base stations.

As is well known in the art, a base station, such as base station 102, 104, or 106, may employ directional antennas to support a plurality of sectors within the coverage area. While in FIG. 1 base stations 104 and 106 are depicted approximately in the center of their associated coverage areas 110 and 124, in other embodiments use of directional antennas may locate the base station near the edge of the coverage area, for example, at the point of a cone-shaped or pear-shaped coverage area.

The connection to the Internet 108 from base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. It is noted that in the case of voice-based communications in the form of voice over IP (VoIP), the traffic will be forwarded directly to the Internet gateway instead of the PSTN gateway. The servers, Internet gateway, and public switched telephone network gateway are not shown in FIG. 1. In another embodiment, the connection to the Internet 108 may be provided by different network nodes and equipment.

Figure 2:
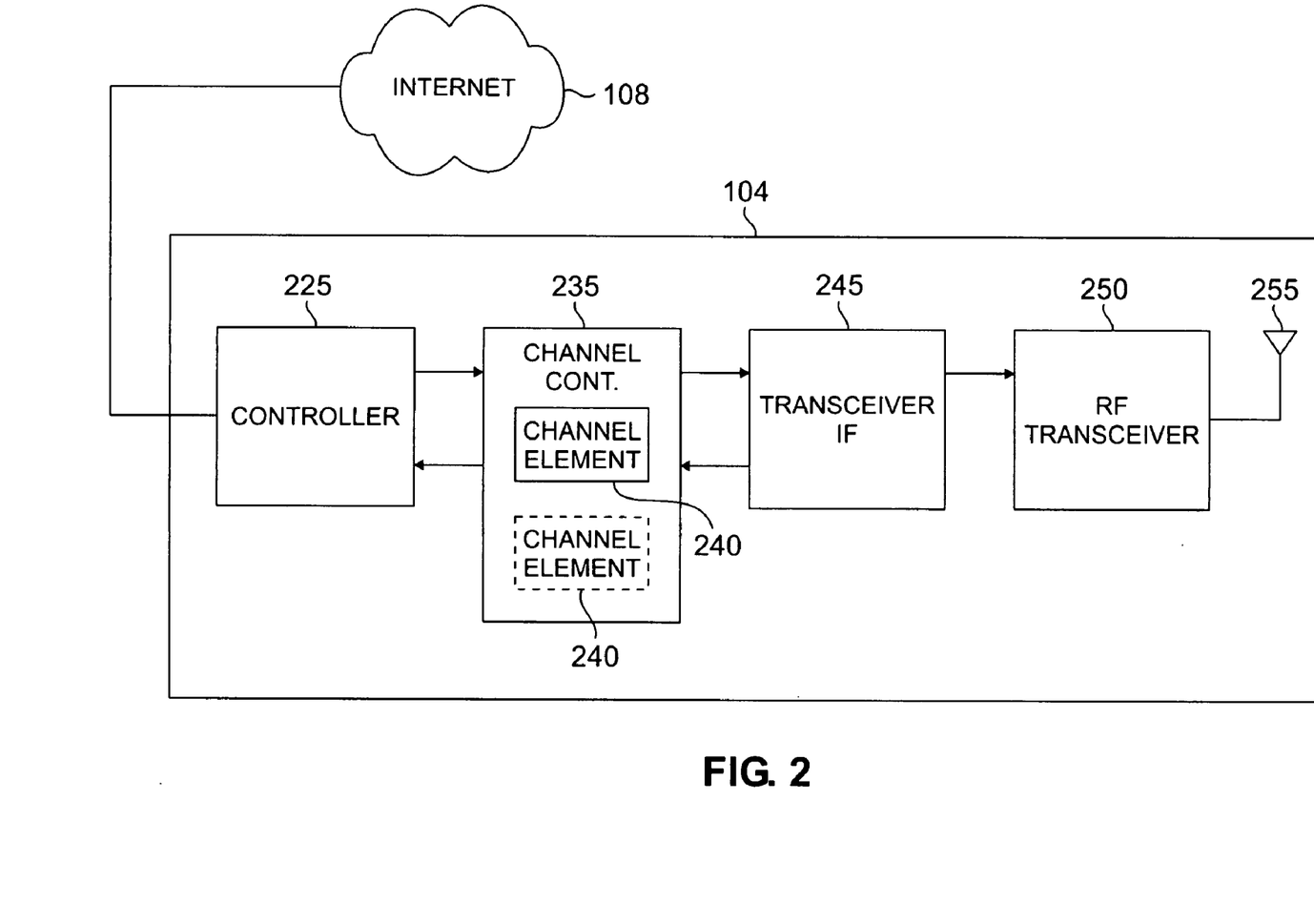
FIG. 2 illustrates a base station in greater detail according to an embodiment of the present disclosure.

FIG. 2 illustrates base station 104 in greater detail according to an embodiment of the present disclosure. Base station 104 is illustrated by way of example only. However, it will be understood that the components illustrated and described with respect to base station 104 are also part of base stations 106 and 102. According to one embodiment, base station 104 comprises controller 225, channel controller 235 (which may comprise at least one channel element 240), transceiver interface (IF) 245, radio frequency (RF) transceiver unit 250, and antenna array 255.

Controller 225 comprises processing circuitry and memory capable of executing an operating program that controls the overall operation of base station 104. In an embodiment, the controller 225 may be operable to communicate with the Internet 108. Under normal conditions, controller 225 directs the operation of channel controller 235, which may comprise a number of channel elements, such as channel element 240, that are each operable to perform bidirectional communication in the forward channel and the reverse channel. In various embodiments, one or more additional channel elements 240 may be used to support independent channels, as indicated by channel element 240 having dashed lines.

A "forward channel" refers to outbound signals from the base station 104 to subscriber stations 112, 114, 116, 118, 120 and 122 and a "reverse channel" refers to inbound signals from subscriber stations 112, 114, 116, 118, 120 and 122 to base station 104. Channel element 240 also preferably performs all baseband processing, including processing any digitized received signal to extract the information or data bits conveyed in the received signal, typically including demodulation, decoding, and error correction operations, as known to those of skill in the art. Channel element 240 also performs transmit signal processing, including encoding, modulation of the transmit signal, and digital-to-analog conversion, unless a digital transceiver IF is used. Transceiver IF 245 transfers bidirectional channel signals between channel controller 235 and RF transceiver unit 250.

As illustrated here, various embodiments comprise multiple independent channel elements 240, each configured to handle communications on a different channel. Although two channel elements 240 are shown here, various embodiments include a separate channel element 240 for each channel supported, and channel controller 235 can support as many channel elements 240 as required by the particular implementation.

Antenna array 255 transmits forward channel signals received from RF transceiver unit 250 to subscriber stations 112-122 in the coverage area of base station 104. Antenna array 255 is also operable to send to RF transceiver unit 250 reverse channel signals received from subscriber stations 112-122 in the coverage area of the base station 104. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Figure 3:
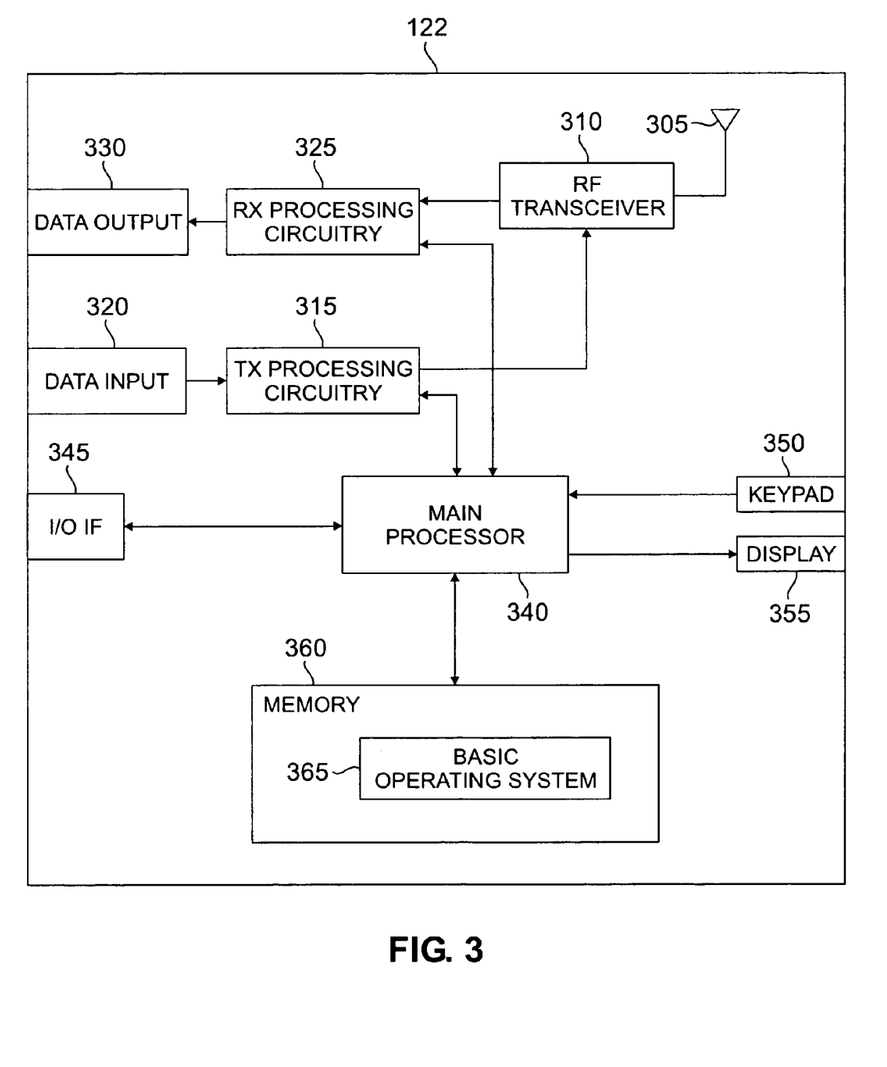
FIG. 3 illustrates a subscriber station in greater detail according to an embodiment of the present disclosure.

FIG. 3 illustrates subscriber station 122 in greater detail according to an embodiment of the present disclosure. Subscriber station 122 is illustrated by way of example only. However, it will be understood that the components illustrated and described with respect to subscriber station 122 also may be part of subscriber stations 112, 114, 116, 118, and/or 120. Subscriber station 122 comprises antenna 305, radio frequency (RF) transceiver 310, transmit (TX) processing circuitry 315, data input 320, receive (RX) processing circuitry 325, and data output 330. Subscriber station 122 also comprises main processor 340, input/output (I/O) interface (IF) 345, keypad 350, display 355, and memory 360.

RF transceiver 310 receives from antenna 305 an incoming RF signal transmitted by base station 104. RF transceiver 310 down-converts the incoming RF signal to produce an intermediate frequency (IF) or a baseband signal. The IF or baseband signal may be sent to receiver processing circuitry 325, which produces a processed baseband signal by filtering, digitizing the baseband or IF signal, additional filtering if necessary, and demodulation and/or decoding. Receiver processing circuitry 325 is also operable to transmit the processed baseband signal to data output 330 (e.g., when the processed baseband signal comprises voice data) or to main processor 340 for further processing (e.g., when the processed baseband signal relates to web browsing).

Transmitter processing circuitry 315 receives analog or digital voice data from data input 320 or other outgoing baseband data (e.g., web data, e-mail, interactive video game data and the like) from main processor 340. Transmitter processing circuitry 315 encodes, modulates, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a non-volatile memory (e.g., Flash or ROM). Main processor 340 executes basic operating system program 365 stored in memory 360 in order to control the overall operation of subscriber station 122. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs (not shown) resident in memory 360. Main processor 340 may move data into or out of memory 360, as required by an executing process.

Main processor 340 is also coupled to the I/O interface 345. I/O interface 345 provides subscriber station 122 with the ability to connect to other devices, such as laptop computers, handheld computers and the like. I/O interface 345 provides a communication path between these accessories and main processor 340. Main processor 340 is also coupled to keypad 350 and display unit 355. The operator of subscriber station 122 may use keypad 350 to enter data into subscriber station 122. Display 355 may comprise a liquid crystal display capable of rendering text, video, images, and/or graphics from websites. It will be understood that additional embodiments may use other types of displays.

Figure 4:
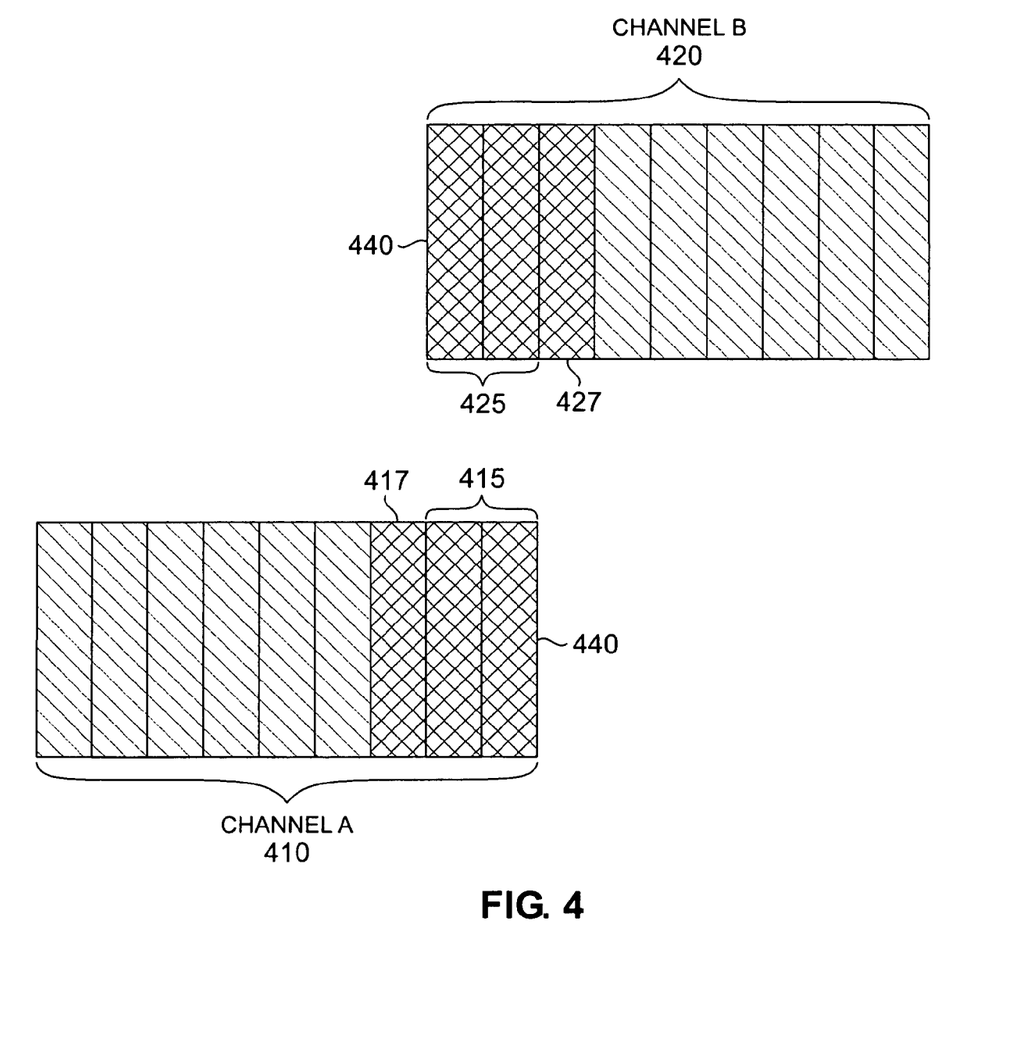
FIG. 4 depicts a simplified block diagram illustrating overlapping subcarriers of adjacent channels according to an embodiment of the present disclosure.

FIG. 4 depicts a simplified block diagram illustrating overlapping subcarriers of adjacent channels according to an embodiment of the present disclosure. FIG. 4 shows Channel A 410 and Channel B 420, each comprising multiple subcarriers 440. Brackets indicate the allocation of subcarriers 440 over the bandwidth allocated to Channel A 410 and Channel B 420. As can be seen, these adjacent and overlapping channels include an overlap region 415 of Channel A 410, and an overlap region 425 of Channel B 420, in which some subcarriers 440 of Channel A 410 overlap (or are shared) with some subcarriers 440 of Channel B 420. Further, these adjacent channels include high-noise subcarrier 417 of Channel A 410 and high-noise subcarrier 427 of Channel B 420, which do not directly overlap the other channel, but still suffer from adjacent-channel interference caused by the other channel.

This simplified diagram only depicts a limited number of subcarriers 440 and channels 410 and 420, and very limited overlap regions 415 and 425 and high-noise subcarriers 417 and 427. Those of skill in the art will recognize that these particulars may vary with the implementation. For example, in some implementations, there are either no overlap regions 415 and 425, or there are no data symbols loaded onto the subcarriers in these regions, but there are multiple high-noise subcarriers 417 and 427 on each channel suffering from adjacent-channel interference, which can produce the same effects as deliberately-overlapped channels.

The present disclosure includes various embodiments in which OFDM techniques are deployed in a scalable way with multiple channels 410 and 420 placed adjacent to and potentially overlapping with each other within a single base station in order to make efficient use of a wider channel bandwidth.

If the adjacent channels 410 and 420 overlap with each other, as at overlap regions 415 and 425, there will be interference in the sub-carriers at the edges of the channels. Similar adjacent channel interference may occur at non-overlapping but adjacent high-noise subcarriers 417 and 427. When the system does not have any channel coding, an error floor appears regardless of the increase in signal-to-thermal noise ratio (SNR).

However, with the use of a sufficiently strong error correction code and symbol interleaving across the sub-carriers, the error rate performance generally suffers a degradation of less than 1 dB, even when the adjacent channels overlap with each other. This is because the errors in the received data due to adjacent interference may be corrected by the use of error correction coding and symbol interleaving across the sub-carriers. As a result, the spectral efficiency of the deployment scenario may be increased because it is not necessary to increase the channel spacing, in case the link budget is able to tolerate the relatively small increase in performance degradation. In each case below, the base station performs error correction coding and bit and/or symbol interleaving to enable the subscriber stations to correct any adjacent-channel or overlapping-channel interference, which is sometimes generically referred to herein as adjacent-channel interference.

Disclosed below are three exemplary deployments of the present disclosure. In preferred embodiments, except for the RF transceiver 250, the base station equipment will operate with the full bandwidth of each channel. Thus, a duplicated and independent set of baseband transceiver equipment as implemented in channel element 240 is preferably used for each channel at each base station, as illustrated in FIG. 2. In other respects, the base stations and subscriber stations in the exemplary deployments below are as described above with relation to FIGS. 1-3.

In a first embodiment, wireless network 100 supports multiple channels 410 and 420 in which sub-carriers 440 of adjacent OFDM channels are allowed to overlap within a single base station, as at overlap regions 415 and 425, by appropriately configuring some or all of base stations 102, 104 and 106 in wireless network 100. In an exemplary implementation, each channel may cover 1.25 MHz of bandwidth with an FFT size of 128, indicating that each channel has 128 subcarriers. A single base station may, for example, support four such channels adjacent to each other, covering a 5 MHz bandwidth block. Because channels can be permitted to overlap, it is possible to either fit more channels in the 5 MHz block, or to fit four 1.25 MHz channels in less than a 5 MHz block, while still complying with the regulatory requirements on spectral emission outside of the 5 MHz spectrum block. For example, additional sub-carriers located near to the edge of the spectrum block may be configured as guard sub-carriers, depending on the regional regulatory requirements on out-of-band spectral emissions.

Note that the number of guard sub-carriers used for the channel at the edge of a spectrum block can be different from that located next to another OFDM channel in the middle of the block, if any guard sub-carriers are configured in the middle of the block at all, by adjusting the the number of subcarriers loaded with a modulation symbol with zero magnitude. At the block edge, it may be necessary for the transmit signal spectrum to comply with the regulatory requirements on out-of-block emission. However, at the center of the block, the concern is the amount of adjacent channel interference. Thus, using the techniques described herein, it is possible to reduce or eliminate the number of guard tones for the center channels so as to optimize the overall spectral efficiency, while guarding against out-of-band spectral emissions.

Moreover, the regulatory requirement on spectral emission outside of the assigned spectral block can vary from country to country. The ease of increasing or reducing the number of guard tones ensures the technology to be deployed flexibly and optimally in different parts of the world. Also, as the out-of-band spectral emission depends on the transmitter circuit design, especially the RF front-end non-linear characteristics. For a more linear design, the amount of spectral emission would be lower, thus a smaller number of guard tones would be required. This would allow a higher spectral usage efficiency. On the other hand, when the transmitter design results in a high-level of out-of-band emission, then a larger number of guard tones would be required to ensure the spectral emission requirement is met, or that the amount of adjacent carrier interference is acceptable to the adjacent channels.

The amount of overlap, that is, the number of subcarriers in overlap regions 415 and 425, may be adjusted by the base station according to the strength of the error correction coding in the subscriber stations and the amount of adjacent channel interference experienced by the subscriber stations. A network operator may determine the optimum tradeoff between these factors during initial deployment. Alternatively, after a network has been deployed, the effective channel spacing can be increased or decreased by changing the configuration of the subcarriers located at the edge of the channel (e.g., increasing the number of guard subcarriers by loading them with modulation symbols that have zero magnitudes). Error correction coding is performed by the wireless network base station according to the number of overlapping subcarriers to enable a subscriber station to correct any adjacent-channel interference (including overlapping-channel interference) the overlapping subcarriers.

Figure 5:
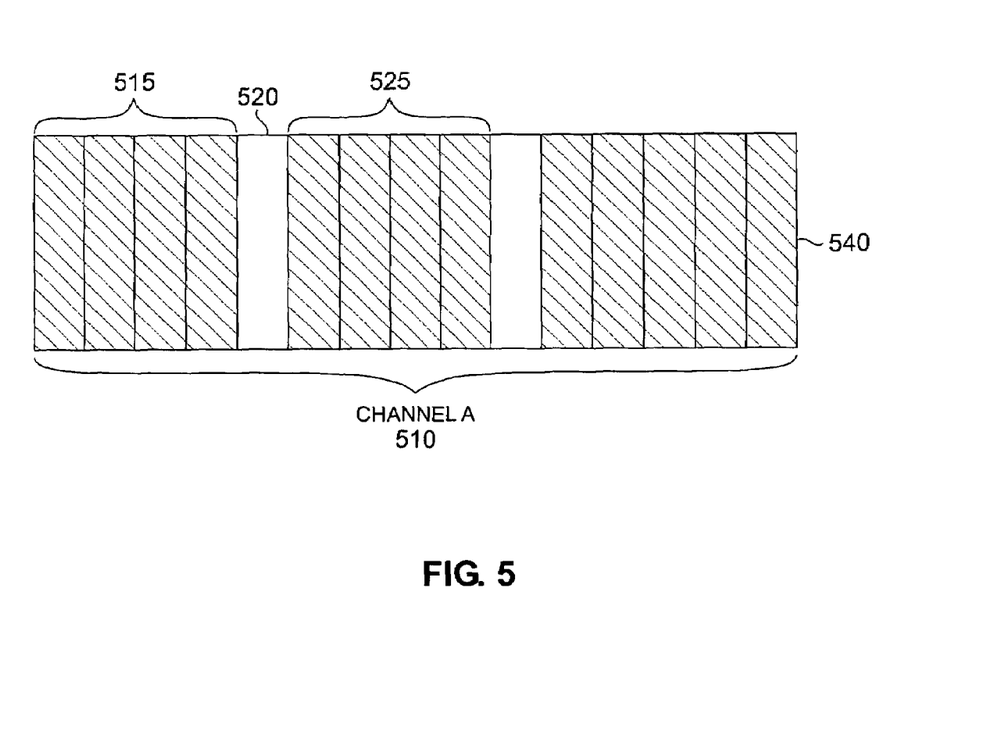
FIG. 5 depicts a simplified block diagram illustrating a single wide channel according to an embodiment of the present disclosure.

FIG. 5 depicts a simplified block diagram illustrating a single wide channel according to an embodiment of the present disclosure. In a second embodiment, a wireless network 100 supports an OFDM system with higher FFT size for a wider bandwidth channel 510, by appropriately configuring some or all of base stations 102, 104 and 106 in wireless network 100. For example, a base station may support a single channel 510 that has an FFT size of 512 and that covers an entire 5 MHz bandwidth block. In this example, the channel 510 would have 512 subcarriers (including all the guard, DC and pilot subcarriers) 540 utilizing the entire 5 MHz block, in contrast to the previous embodiment.

In order to serve users that are operating with smaller bandwidth and FFT size, sub-channels are allocated in a manner similar to the advanced modulation and coding (AMC) mode in the IEEE-802.16e standard, known to those of skill in the art. In this way, specific and contiguous sets of subcarriers 515 and 525 are assigned to a specific subscriber station, for example, by assigning subscriber station 122 to a set of subcarriers 515, and subscriber station 120 to a set of subcarriers 525. The subscriber station 122 then only responds to the set of subcarriers 515, and ignores the other subcarriers in the channel, including the set of subcarriers 525. In this way, by assigning different sets of subcarriers 515 and 525 to different subscriber stations 120 and 122, the 5 MHz channel with 512 subcarriers effectively simulates separate channels with smaller bandwidth and numbers of subcarriers. If there is great adjacent-channel interference, guard sub-carriers 520 may be created to separate the sets of sub-carriers by loading modulation symbols with zero magnitudes to those guard sub-carriers 520.

In this way, the forward channel may transmit and receive with a wider bandwidth and higher FFT size to multiple subscriber stations, while the subscriber stations can operate with different FFT size and channel bandwidths that are smaller than the operating bandwidth at the base station. The base station transceiver can operate over the entire channel bandwidth, while a subscriber station 122 only operates over a bandwidth which may be smaller than the entire base station operating bandwidth.

According to a third exemplary embodiment, wireless network 100 supports an OFDM system with an appropriate FFT size for the entire channel bandwidth, as in the case above, by appropriately configuring some or all of base stations 102, 104 and 106 in wireless network 100. However, instead of assigning guard sub-carriers 520 for sub-channels allocated to users with a smaller channel bandwidth and FFT size, no guard intervals are necessary when the appropriate error correction coding and symbol interleaving schemes are used. As above, the base station equipment needs to operate over the entire channel bandwidth, whereas the individual user equipment needs only to operate over its own bandwidth of interest by communicating on its particular set of subcarriers 515 or 525. Error correction coding, bit and/or data symbol interleaving is performed by the wireless network base station to enable the subscriber stations to correct adjacent-channel interference between different ones of the plurality of sets of subcarriers.

The above methods allow a variety of possible deployment schemes. Depending on other design parameters and characteristics of the system, an optimum scheme may be selected. For example, the second embodiment described above can be used when a less strong coding is used for a link which requires very low error rate performance or link budget with a smaller margin. Alternatively, the first and third embodiments described above allow more efficient use of spectrum by using stronger error correction coding techniques, or tolerating higher link performance degradation. On the other hand, other techniques such as hybrid ARQ (HARQ) or adaptive modulation and coding schemes may be used to reduce the link performance degradation.

In alternate embodiments, when a more robust, lower-order modulation class is used for data transmission using the OFDM signal, a smaller number of guard tones can be used between adjacent OFDM channels. As the modulation order is increased (e.g., from QPSK to 16-QAM), the number of guard tones can be increased, resulting in a larger effective spacing between adjacent channels. The reliability of the transmission can be maintained at a desired level by avoiding transmission of data symbols in the edge subcarriers that are subject to adjacent channel interference, in addition to using other techniques described herein.

In other implementations, the number of guard subcarriers can also be adjusted according to the location of the channel within the first bandwidth allocation or spectrum block or according to the design of the base station transmitter. To support differing numbers of guard subcarriers, in some embodiments base stations 102, 104 and 106 in wireless network 100 are configured to transmit guard subcarrier configuration information to a mobile station when the mobile station registers with the respective base station, or when the guard subcarrier configuration information changes during a transmission. This can be done implicitly through the subcarrier/subchannel scheduling, or explicit signaling can be done to indicate changes in the subchannel that normally contains the new guard subcarriers, etc.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A wireless network base station comprising:
   a channel controller for configuring the wireless network base station to communicate on at least a first channel having a plurality of subcarriers across a first bandwidth allocation and a second channel having a plurality of subcarriers across a second bandwidth allocation;
   wherein one or more of the subcarriers of the first channel overlap with one or more of the subcarriers of the second channel;
   wherein at least one of i) error correction coding, ii) bit interleaving, and iii) symbol interleaving is performed by the wireless network base station according to the number of subcarriers of the first channel that overlap with subcarriers of the second channel to enable a subscriber station to correct adjacent-channel interference from one or more overlapping subcarriers; and
   wherein the wireless network base station adjusts an amount of subcarrier overlap according to at least one of: an amount of adjacent-channel interference and a strength of the error correction coding.

2. The wireless network base station of claim 1, wherein the amount of adjacent-channel interference and the strength of the error correction coding are determined during initial deployment of the network.

3. The wireless network base station of claim 1, wherein the amount of adjacent-channel interference and the strength of the error correction coding are determined after the network has been deployed.

4. The wireless network base station of claim 1, wherein the wireless network base station includes a channel element for each channel, each channel element capable of performing baseband processing.

5. The wireless network base station of claim 1, wherein the wireless network base station supports orthogonal frequency division multiplexing.

6. The wireless network base station of claim 1, wherein at least one of the plurality of subcarriers of the first channel is a high-noise subcarrier.

7. The wireless network base station of claim 1, wherein at least one of the plurality of subcarriers of the second channel is a high-noise subcarrier.

8. A method of operating a wireless network base station comprising the steps of:
   communicating with subscriber stations on at least a first channel having a plurality of subcarriers across a first bandwidth allocation and a second channel having a plurality of subcarriers across a second bandwidth allocation, wherein the subcarriers of the first channel overlap with subcarriers of the second channel;
   performing an error correction coding to enable a subscriber station to correct adjacent-channel interference from overlapping subcarriers; and
   adjusting an amount of subcarrier overlap according to at least one of: an amount of adjacent-channel interference and a strength of the error correction coding.

9. The method of claim 8, wherein the amount of adjacent-channel interference and the strength of the error correction coding are determined during initial deployment of the network.

10. The method of claim 8, wherein the amount of adjacent-channel interference and the strength of the error correction coding are determined after the network has been deployed.

11. method of claim 8, wherein the wireless network base station supports orthogonal frequency division multiplexing.

12. The method of claim 8, wherein the wireless network base station includes a channel element for each channel, each channel element capable of performing baseband processing.

13. The method of claim 8, wherein at least one of the plurality of subcarriers of the first channel is a high-noise subcarrier.

14. The method of claim 8, wherein at least one of the plurality of subcarriers of the second channel is a high-noise subcarrier.

15. A wireless communication network comprising a plurality of base stations, each of the base stations capable of communicating with a plurality of subscriber stations, each base station comprising:
   a channel controller for configuring the wireless network base station to communicate on at least a first channel having a plurality of subcarriers across a first bandwidth allocation and a second channel having a plurality of subcarriers across a second bandwidth allocation;
   wherein one or more of the subcarriers of the first channel overlap with one or more of the subcarriers of the second channel;
   wherein at least one of i) error correction coding, ii) bit interleaving, and iii) symbol interleaving is performed by the wireless network base station according to the number of subcarriers of the first channel that overlap with subcarriers of the second channel to enable one of the subscriber stations to correct adjacent-channel interference from one or more overlapping subcarriers; and
   wherein the wireless network base station adjusts an amount of subcarrier overlap according to at least one of: an amount of adjacent-channel interference and a strength of the error correction coding.

16. The wireless communication network of claim 15, wherein the amount of adjacent-channel interference and the strength of the error correction coding are determined during initial deployment of the network.

17. The wireless communication network of claim 15, wherein the amount of adjacent-channel interference and the strength of the error correction coding are determined after the network has been deployed.

18. The wireless communication network of claim 15, wherein each wireless network base station includes a channel element for each channel, each channel element capable of performing baseband processing.

19. The wireless communication network of claim 15, wherein each wireless network base station supports orthogonal frequency division multiplexing.

20. The wireless communication network of claim 15, wherein at least one of the plurality of subcarriers of the first channel is a high-noise subcarrier.

* * * * *